Sept. 6, 1927.
F. V. DONALD
1,641,158
TRACTOR CULTIVATOR COMBINATION
Filed May 25, 1922     2 Sheets-Sheet 2
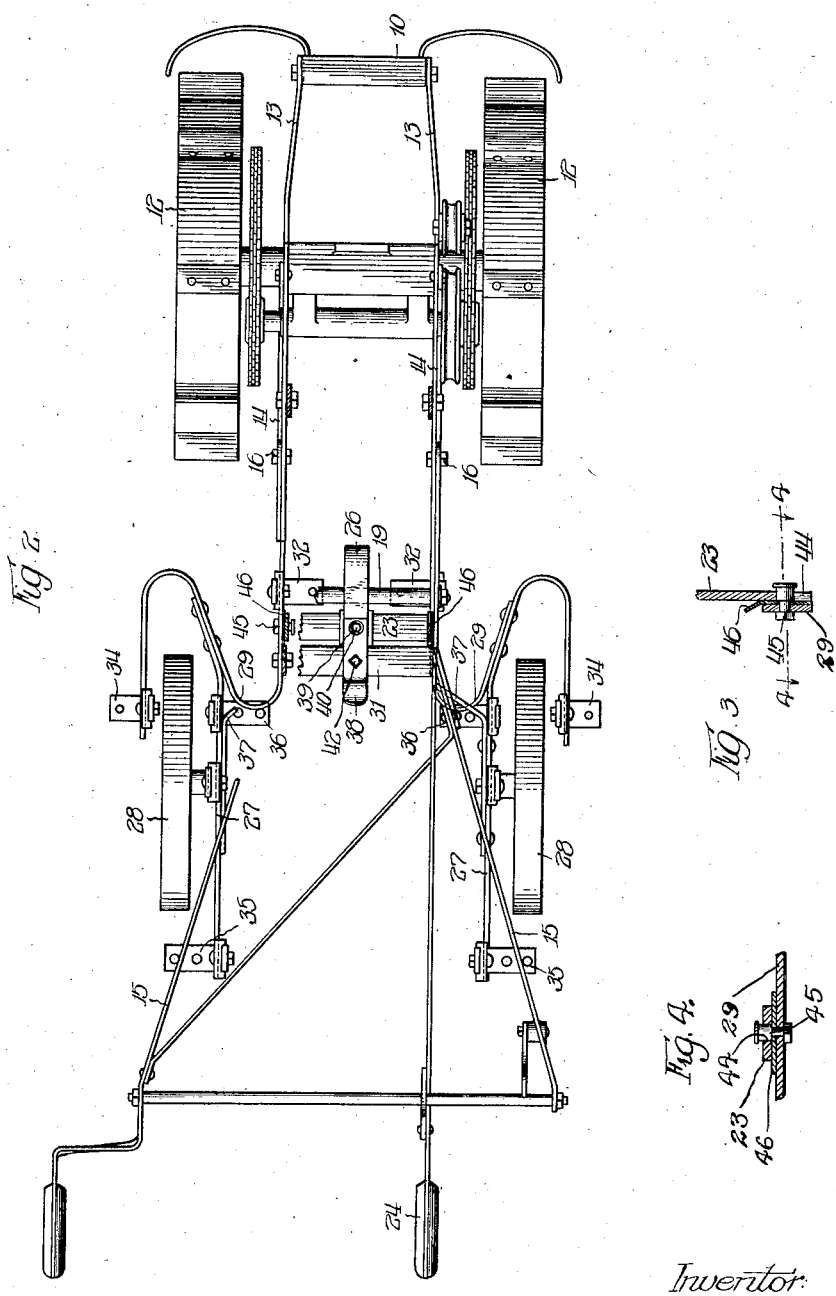

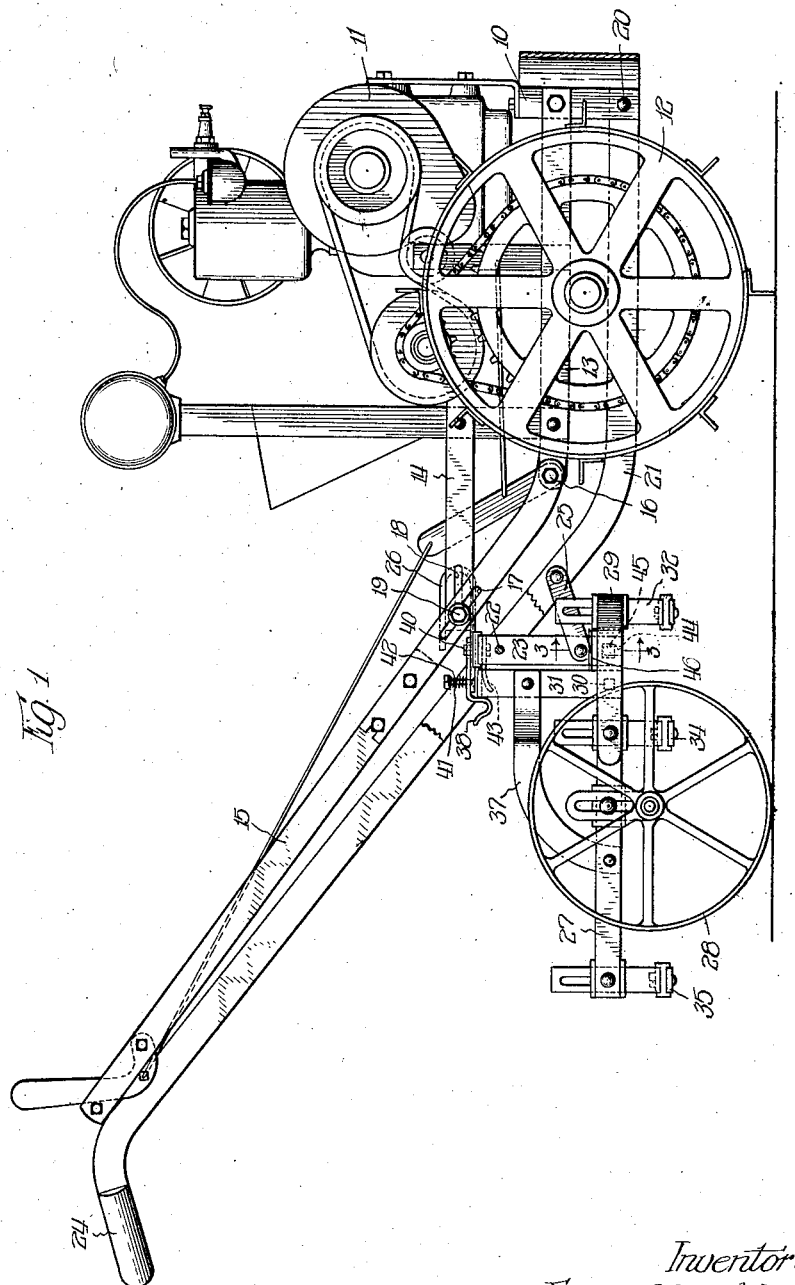

Patented Sept. 6, 1927.

1,641,158

UNITED STATES PATENT OFFICE.

FORREST V. DONALD, OF FORT WASHINGTON, WISCONSIN, ASSIGNOR TO GILSON MANUFACTURING COMPANY, OF PORT WASHINGTON, WISCONSIN, A CORPORATION OF WISCONSIN.

TRACTOR-CULTIVATOR COMBINATION.

Application filed May 25, 1922. Serial No. 563,489.

This invention relates to a tractor and cultivator combination.

One object of the invention is to provide simple, reliable and efficient means whereby a tool carrying frame may be quickly attached to and detached from a tractor.

Another object is to provide a tractor and cultivator combination in which the tools may be arranged in a plurality of different groups and for meeting different cultivating requirements.

Another object is to provide simple and efficient means whereby the control parts of the cultivator may be simply and quickly adjusted for accommodating the operator.

These and other objects are accomplished by means of the arrangement disclosed on the accompanying sheets of drawings, in which—

Figure 1 is a fragmentary side elevation of a tractor and cultivator combination embodying my invention;

Figure 2 is a top plan view of the same arrangement; and

Figure 3 is a fragmentary sectional view taken in the plane of line 3—3 of Figure 1.

Figure 4 is a sectional view taken along line 4—4 of Figure 3.

The various novel features of the invention will be apparent from the following description and drawings, and will be particularly pointed out in the appended claims.

Referring to the figures of the drawings, it will be noted that the invention is illustrated in connection with a tractor including a main frame 10 upon which a propelling motor 11 is mounted and which frame is supported by ground engaging propelling wheels 12 operably connected to the engine 11 through any suitable power transmission mechanism.

The main frame includes a plurality of longitudinally extending members 13 and 14 to which frame control handle bars 15 are flexibly connectetd. The bars 15 at their lower ends are pivotally connected at 16 to the rear ends of the frame members 13 whereby said handle bars 15 may be given a vertical pivotal movement. Such handle bars 15 are provided with elongated slots 17 and the rear ends of frame members 14 are provided with elongated slots 18 through which bolts 19 pass. By referring particularly to Figure 1 of the drawings, it will be noted that by loosening the nuts on the bolts 19 the height of the control handle bars 15 may be varied to accommodate the operator, and when the adjustment is made the nuts on the bolts 19 may be tightened for holding the parts in adjusted position. Preferably, loosely and pivotally connected to the main frame at 20 in advance of the propelling wheels 12 are rearwardly extending members 21 which are connected at 22 to an arch member 23, which arch member holds the bars 21 in spaced relationship. One of the bars 21 continues rearwardly and terminates in a control handle 24 by means of which the tools to be referred to later, may be held in a given position when the tractor is turned or given a change in direction by moving the handle bars 15 laterally in one direction or the other. To support the lower ends of the arch member 23, tie straps 25 are provided, which connect the lower ends of the arch 23 to the bars 21. Secured to the top cross member of the arch 23 is a looped member 26 which extends forwardly from the arch and receives the bolt 19 to maintain the relative vertical positions of the main frame and the arch member 23 to which the cultivator tool carrying frame to be referred to later, is attached.

The cultivator attachment includes two main bars 27 at opposite sides thereof, one portion of each of which extends longitudinally and at the inner side and to the rear of an associated ground engaging depth control wheel 28, the front portion of each bar being looped around in front of the associated wheel and then extending rearwardly to the outer side thereof. Each main bar 27 is secured to a loop shaped bracket 29, the inner portion of which is secured at 30 to an arch member 31 which acts as a spacer between such brackets and forms a portion of means whereby the cultivator may be quickly attached to and detached from the tractor in a manner to be described hereinafter. Secured to the front end of each of the brackets 29 is a tool holding standard 32 preferably for the reception of hoes which should extend outwardly from said standards to points directly in front of the associated wheels 28 for cutting away any weeds. Secured to the rear end of the loop portion of the main tool carrying bar is a tool carrying bracket 34 to which a cultivator shovel may be attached to cultivate the soil outwardly from the associated wheel 28. Another tool carrying standard 35 is secured to the rear end of the straight portion of each main tool carrying bar 27, and in addition thereto at an intermediate point of said bar 27 another tool carrying standard 36 may be secured. It will be noted that each of the standards is provided with a plurality of openings whereby the tools may be secured in various adjusted positions for cultivating the soil at variable distances from the rows of vegetation.

By means of this arrangement, single or double row cultivation can be accomplished. If it is desired to cultivate a single row the tools which may be secured to the standard 34 may be removed, whereupon only the soil located inwardly from the wheels 28 and outwardly from the row of vegetation will be cultivated. It will be understood that the wheels 28 travel midway between the rows of vegetation and, accordingly, if it is desired to cultivate the soil directly adjacent the adjoining rows of vegetation, tools will be secured to the standards 34. With all of the tools in use it will be appreciated that all of the soil on opposite sides of a single row of vegetation and to the adjacent rows will be cultivated. When a single row cultivating arrangement is provided, the standards 35 are so arranged that their cultivator shovels or teeth follow directly behind the guide or depth control wheels 28 for cultivating the ground which has been pressed down by said wheels.

For bracing the frame members of the cultivator, curved brace brackets 37 are provided which extend between and are secured to the main bars 27 and the arch member 31 at intermediate points of both.

In connection with quickly attaching the cultivator to the tractor and quickly detaching it therefrom, there is loosely secured to the rear end of the loop member 26, a spring pressed latch member 38 which is provided with an aperture 39 loosely receiving the head 40 of a bolt whereby the latch member is maintained in operative position. A bolt 41 is secured to the rear end of loop member 26, extends through an aperture in the latch member 38 and has a coiled spring 42 surrounding said bolt and interposed between the head thereof and the latch 38, whereby the latch is yieldably held in its lowermost position engaging the rear end of the loop member 26 which is secured to the arch member 23. Secured to the under side of the arch member 23 and projecting rearwardly therefrom in the same vertical plane with the latch member 38, is a retaining lip 43, which cooperates with the latch 38 for receiving and holding the arch member 31 of the cultivator. The lower ends of the arch member 23 are provided with open ended slots 44 which are arranged to take over or receive studs 45 which extend inwardly from the brackets 29, whereby the cultivator frame may be definitely located with respect to the tractor frame and steadied in such cooperative position. To guide the lower ends of the arch bar 23 into operative position when the cultivator is being attached to the tractor, there is secured to each of the brackets 29 guide members 46 which flare outwardly or converge downwardly toward the studs 45 which receive the slotted ends of the arch bar 23.

By means of the arrangement thus described the cultivator can be quickly snapped into attached position and quickly detached from the tractor, the application of the cultivator to the tractor being guided by the guide members 46. It will be understood in attaching the cultivator to the tractor, the front end of the cultivator will first be dipped or the rear of the tractor frame pivoted upwardly so that the inwardly extending studs 45 will be in a position to enter the open ended slots 44 in the arch 23 and so that the top of the arch member 31 underlies the downwardly extending portion of the latch 38, whereupon the front end of the cultivator may be raised or the rear of the tractor lowered, permitting the studs 45 to ride into the slots 44 and causing the latch to yield upwardly until the transverse top member of the arch member 31 is in a position to slide forwardly over the lip 43, whereupon when the arch member 31 is moved forwardly to its normally connected position, the spring pressed latch 38 springs downwardly under the influence of spring 42 for yieldably locking the cultivator in its operative position. The lip 43 is curved downwardly at its outer end to guidedly receive the arch member 31. To quickly detach the cultivator from the tractor, it is merely necessary to raise the spring pressed latch 38 whereupon the front of the cultivator frame may be lowered or the rear end of the tractor frame raised. By means of this snap connection the cultivator may be attached to or detached from the tractor in an instant.

It is my intention to cover all modifications of the invention falling within the spirit and scope of the following claims.

I claim:

1. In combination, a tractor having an arch frame member, the lower ends of which are slotted, a latch member carried by said arch frame member, a detachable frame, means carried by the detachable frame to enter said slotted ends, and means for guiding said slotted ends into an operative position with respect to the aforesaid means.

2. In combination a tractor having a main frame member, forked portions on said frame member, a latch carried by the frame member, a detachable frame, means carried by the detachable frame adapted to engage the forked portions of the main frame, and a member forming part of the detachable frame and adapted to be secured to the main frame by said latch.

3. In combination, a tractor having a main frame member, a detachable frame, interengaging latching means carried by the main and detachable frames, and interengaging means on the two frames adapted to permit a pivoted movement between the frames to bring the latching means together.

4. In combination, a tractor having a main frame member, a detachable frame, interengaging latching means carried by the main and detachable frames, interengaging means on the two frames adapted to permit a pivoted movement between the frames to bring the latching means together, guide means adapted to guide the pivoting interengaging means together, and guide means adapted to guide the latching means together.

Signed at Port Washington, Wisconsin, this 19th day of May, 1922.

FORREST V. DONALD.